US012173672B2

(12) United States Patent
Dudar et al.

(10) Patent No.: US 12,173,672 B2
(45) Date of Patent: Dec. 24, 2024

(54) FUEL SYSTEM FOR A VEHICLE

(71) Applicant: FORD GLOBAL TECHNOLOGIES, LLC, Dearborn, MI (US)

(72) Inventors: Aed M. Dudar, Canton, MI (US); Scott Alan Bohr, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 90 days.

(21) Appl. No.: 18/158,206

(22) Filed: Jan. 23, 2023

(65) Prior Publication Data

US 2024/0247623 A1 Jul. 25, 2024

(51) Int. Cl.
*F02M 25/08* (2006.01)

(52) U.S. Cl.
CPC .... *F02M 25/0809* (2013.01); *F02M 25/0836* (2013.01); *F02M 25/0854* (2013.01)

(58) Field of Classification Search
CPC ........... F02M 25/0809; F02M 25/0836; F02M 25/0854
See application file for complete search history.

(56) References Cited

U.S. PATENT DOCUMENTS 5,056,494 A * 10/1991 Kayanuma ......... F02M 25/0872 123/519
5,191,870 A * 3/1993 Cook ................. F02M 25/0809 123/198 D
5,297,529 A * 3/1994 Cook ................. F02M 25/0818 123/198 D
5,697,348 A * 12/1997 Schwager .......... F02M 25/0836 123/520
9,644,552 B2 * 5/2017 Dudar ........................ F17C 5/02
10,006,413 B2 * 6/2018 Dudar ................ F02M 25/0872
10,830,189 B1 * 11/2020 Dudar .................. F02M 25/089
10,981,445 B2 * 4/2021 Dudar .............. B60K 15/03504
11,104,222 B2 * 8/2021 Dudar .............. B60K 15/03504
11,333,095 B1 * 5/2022 Dudar ................ F02M 25/0836
11,493,001 B1 * 11/2022 Dudar ................ F02M 25/0818
11,815,041 B2 * 11/2023 Dudar ................ F02M 25/0836
2011/0166765 A1 * 7/2011 DeBastos ......... B60K 15/03504 123/520
2017/0008390 A1 * 1/2017 Dudar ................... F02D 41/003
2017/0130659 A1 * 5/2017 Dudar ................ F02M 25/0836
2019/0368444 A1 * 12/2019 Dudar ................ F02M 25/0854

* cited by examiner

*Primary Examiner* — Phutthiwat Wongwian
*Assistant Examiner* — Susan E Scharpf
(74) *Attorney, Agent, or Firm* — Vincent Mastrogiacomo; Brooks Kushman P.C.

(57) ABSTRACT

A method for controlling a fuel vapor recovery system having first, second, and third canisters and a plurality of control valves includes (i) performing a leak test; (ii) in response to the pressure of the entirety of the fuel vapor recovery system increasing to less than a threshold value from a target vacuum pressure within a predetermined period after obtaining the target vacuum pressure during the leak test, outputting a signal indicating that the fuel vapor recovery system is not leaking; and (iii) in response to the pressure of the entirety of the fuel vapor recovery system increasing to greater than the threshold value from the target vacuum pressure within the predetermined period after obtaining the target vacuum pressure during the leak test, outputting a signal indicating that the fuel vapor recovery system is leaking.

19 Claims, 6 Drawing Sheets

FUEL SYSTEM FOR A VEHICLE

TECHNICAL FIELD

The present discloser relates to fuel systems for vehicles.

BACKGROUND

Vehicles may include fuel systems that are configured to deliver fuel from a fuel tank to an internal combustion engine.

SUMMARY

A fuel vapor recovery system includes a first canister, a second canister, a third canister, a first valve, a second valve, a third valve, a fourth valve, and a controller. The first and second canisters are each in fluid communication with a fuel tank and are configured to receive and store evaporated fuel from the fuel tank. The third canister is disposed between each of the first and second canisters and ambient surroundings. The first valve is disposed between the fuel tank and each of the first and second canisters, is configured to establish fluid communication between the fuel tank and the first canister but not the second canister when in a first position, is configured to establish fluid communication between the fuel tank and the second canister but not the first canister when in a second position, and is configured to establish fluid communication between the fuel tank and each of the first and second canisters when in a third position. The second valve is disposed between the first canister and the third canister. The third valve is disposed between the second canister and the third canister. The fourth valve is disposed between the third canister and the ambient surroundings. Each of the second, third, and fourth valves are configured to transition between open and closed positions. The controller is programmed to, initiate a fuel vapor recovery system leak test, the fuel vapor recovery system leak test including transitioning the first valve to the third position, transitioning the second valve to the open position, transitioning the third valve to the open position, transitioning the fourth valve to the closed position, evacuating the fuel vapor recovery system to obtain a target vacuum pressure, and observing an increase in the pressure of the fuel vapor recovery system from the target vacuum pressure. The controller is further programmed to, in response to the pressure of the fuel vapor recovery system increasing to less than a threshold value from the target vacuum pressure within a predetermined period after obtaining the target vacuum pressure during fuel vapor recovery system leak test, output a signal indicating that the fuel vapor recovery system is not leaking. The controller is further programmed to, in response to the pressure of the fuel vapor recovery system increasing to greater than the threshold value from the target vacuum pressure within a predetermined period after obtaining the target vacuum pressure during fuel vapor recovery system leak test, output a signal indicating that the fuel vapor recovery system is leaking.

A method for controlling a fuel vapor recovery system having first, second, and third canisters and a plurality of control valves includes (i) isolating the entirely of the fuel vapor recovery system from the ambient surroundings during a leak test via adjusting the plurality of valves; (ii) evacuating the entirety of the fuel vapor recovery system to obtain a target vacuum pressure during the leak test; (iii) in response to the pressure of the entirety of the fuel vapor recovery system increasing to less than a threshold value from the target vacuum pressure within a predetermined period after obtaining the target vacuum pressure during the leak test, outputting a signal indicating that the fuel vapor recovery system is not leaking; and (iv) in response to the pressure of the entirety of the fuel vapor recovery system increasing to greater than the threshold value from the target vacuum pressure within the predetermined period after obtaining the target vacuum pressure during the leak test, outputting a signal indicating that the fuel vapor recovery system is leaking.

A vehicle includes an engine, a fuel tank, a fuel vapor recovery system, a first primary canister, a second primary canister, a secondary canister, a fuel tank vent valve, a first primary canister vent valve, a second primary canister vent valve, a secondary canister vent valve, a canister purge valve, and a controller. The engine is configured to propel the vehicle. The fuel is tank configured to store fuel. The fuel vapor recovery system includes the first primary canister, second primary canister, secondary canister, fuel tank vent valve, first primary canister vent valve, second primary canister vent valve, and secondary canister vent valve. The first and second primary canisters are arranged in parallel. The first and second primary canisters are each in fluid communication with the fuel tank and are configured to receive and store evaporated fuel from the fuel tank. The secondary canister is disposed between each of the first and second primary canisters and the ambient surroundings. The fuel tank vent valve (i) is disposed between the fuel tank and each of the first and second primary canisters, (ii) is configured to establish fluid communication between the fuel tank and the first primary canister but not the second primary canister when in a first position, (iii) is configured to establish fluid communication between the fuel tank and the second primary canister but not the first primary canister when in a second position, and is (iv) configured to establish fluid communication between the fuel tank and each of the first and second primary canisters when in a third position. The first primary canister vent valve (i) is disposed between the first primary canister and the secondary canister, (ii) is configured to isolate the first primary canister from the secondary canister when in a closed position, and (iii) is configured to establish fluid communication between the first primary canister and the secondary canister when in an open position. The second primary canister vent valve (i) is disposed between the second primary canister and the secondary canister, (ii) is configured to isolate the second primary canister from the secondary canister when in a closed position, and (iii) is configured to establish fluid communication between the second primary canister and the secondary canister when in an open position. The secondary canister vent valve (i) is disposed between the secondary canister and ambient surroundings, (ii) is configured to isolate the secondary canister from the ambient surroundings when in a closed position, and (iii) is configured to establish fluid communication between the secondary canister and the ambient surroundings when in an open position. The canister purge valve is (i) disposed between each of the first and second primary canisters and the engine, (ii) is configured to isolate each of the first and second primary canisters from the engine when in a closed position, and (iii) is configured to establish fluid communication between each of the first and second primary canisters and the engine when in an open position. The controller is programmed to, periodically initiate a fuel vapor recovery system leak test, the fuel vapor recovery system leak test including (i) transitioning the fuel tank vent valve to the third position, (ii) transitioning the first primary canister vent valve to the corresponding open position, (iii) transitioning the second primary canister vent valve to the corresponding open position, (iv) transitioning the secondary canister vent valve to the corresponding closed position, (v) transitioning the canister purge valve to the open position to decrease a pressure of the fuel vapor recovery system to a target vacuum pressure, (vi) close canister purge valve after obtaining the target vacuum pressure, (vii) observing an increase in the pressure of the fuel vapor recovery system from the target vacuum pressure while the canister purge valve is closed. The controller is further programmed to, in response to the pressure of the fuel vapor recovery system increasing to less than a threshold value from the target vacuum pressure within a predetermined period while the canister purge valve is closed during fuel vapor recovery system leak test, output a signal indicating that the fuel vapor recovery system is not leaking. The controller is further programmed to, in response to the pressure of the fuel vapor recovery system increasing to greater than the threshold value from the target vacuum pressure within the predetermined period while the canister purge valve is closed during fuel vapor recovery system leak test, output a signal indicating that the fuel vapor recovery system is leaking.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The following description relates to systems and methods for onboard refueling vapor recovery (ORVR) in heavy duty vehicles. An evaporative emissions control (EVAP) system configured for ORVR includes a fuel tank fluidly coupled to at least two canisters via a single passage with a number of branches equal to a number of canisters with a balance valve arranged upstream of a branching point of the passage relative to a direction of fuel vapor flow. The EVAP system may therefore also be referred to as the fuel vapor recovery system. Additionally, the at least two canisters are each coupled to a canister vent valve of n number of canister vent valves, that may be actuated to isolate the respective canister from the atmosphere, where the number of canister vent valves is equal to the number of canisters. The method for ORVR using this system includes purging the at least two canisters, which are arranged in a parallel loading and unloading flow direction, by adjusting flow among the at least two canisters to increase flow through a higher loaded canister of the at least two second canisters.

Figure 1:
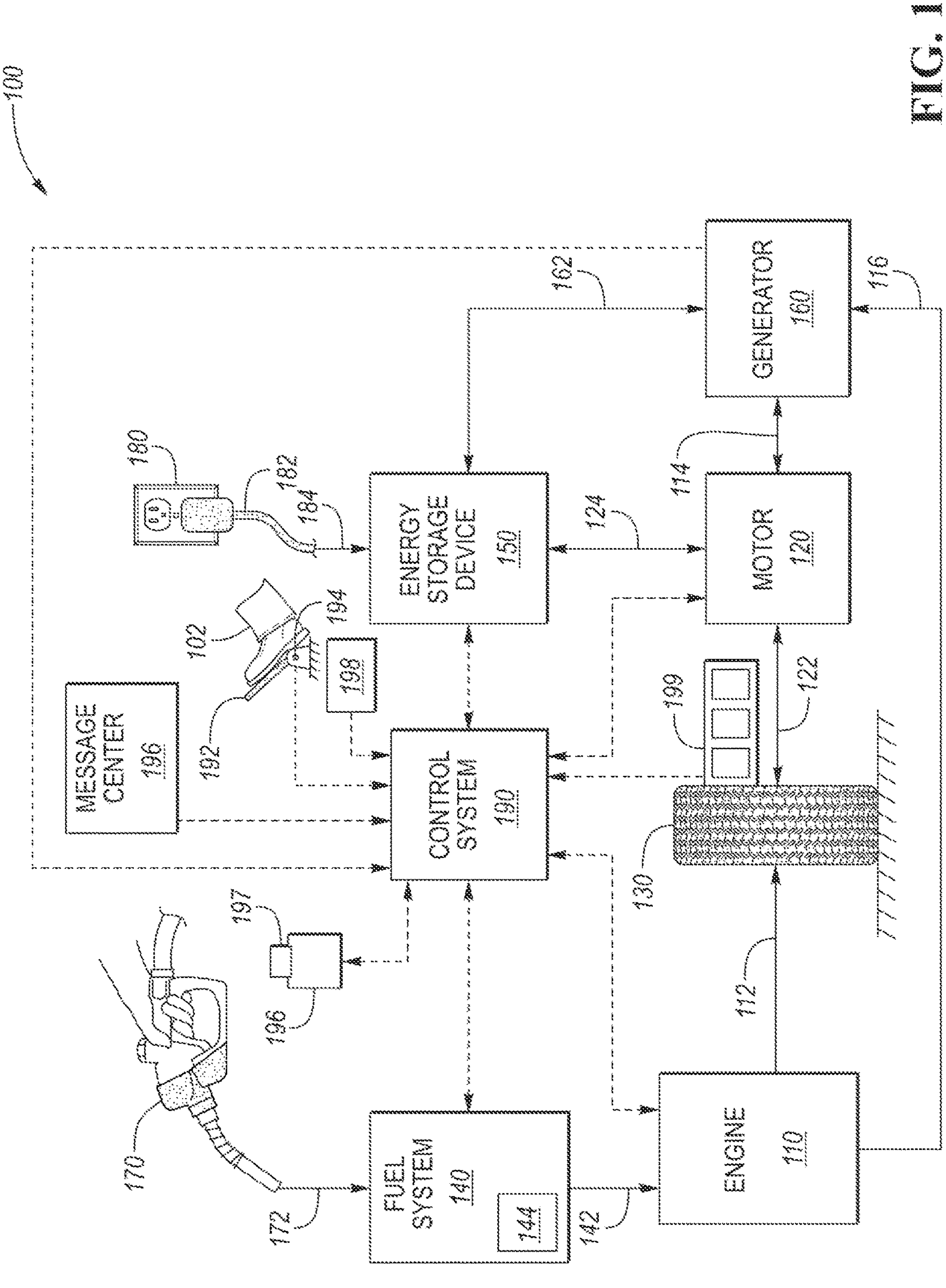
FIG. 1 shows a block diagram illustrating an example vehicle propulsion system.

Vehicle propulsion systems for a hybrid electric vehicle, an example of which is shown in FIG. 1, may include a fuel burning engine and a motor. The engine may be coupled to a fuel system and an evaporative emissions control system, shown in FIG. 2, which may recover fuel vapors from the fuel tank, such as fuel vapors generated during refueling, and may store the captured fuel vapors in a fuel vapor canister, and then purge the captured fuel vapors into an engine intake system to be used as fuel. FIG. 3 shows an example evaporative emissions control system, as may be included in FIG. 2, configured with two fuel vapor canisters arranged in the parallel loading and unloading flow direction, each of the canisters configured with a canister vent valve to selectively isolate the respective canister from the atmosphere. The evaporative emissions control system of FIG. 3 may be configured with more than one fuel vapor canisters, each with a canister vent valve. The evaporative emissions control system of FIG. 3 also includes a balance valve on a load line, which can be used to selectively couple one or both of the canisters to the fuel tank. When configured with two canisters, the balance valve may be a three-way balance valve and, when configured with n number of canisters, the balance valve may be a n-way balance valve.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle, such as from solar or wind energy. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling.

For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

Figure 2:
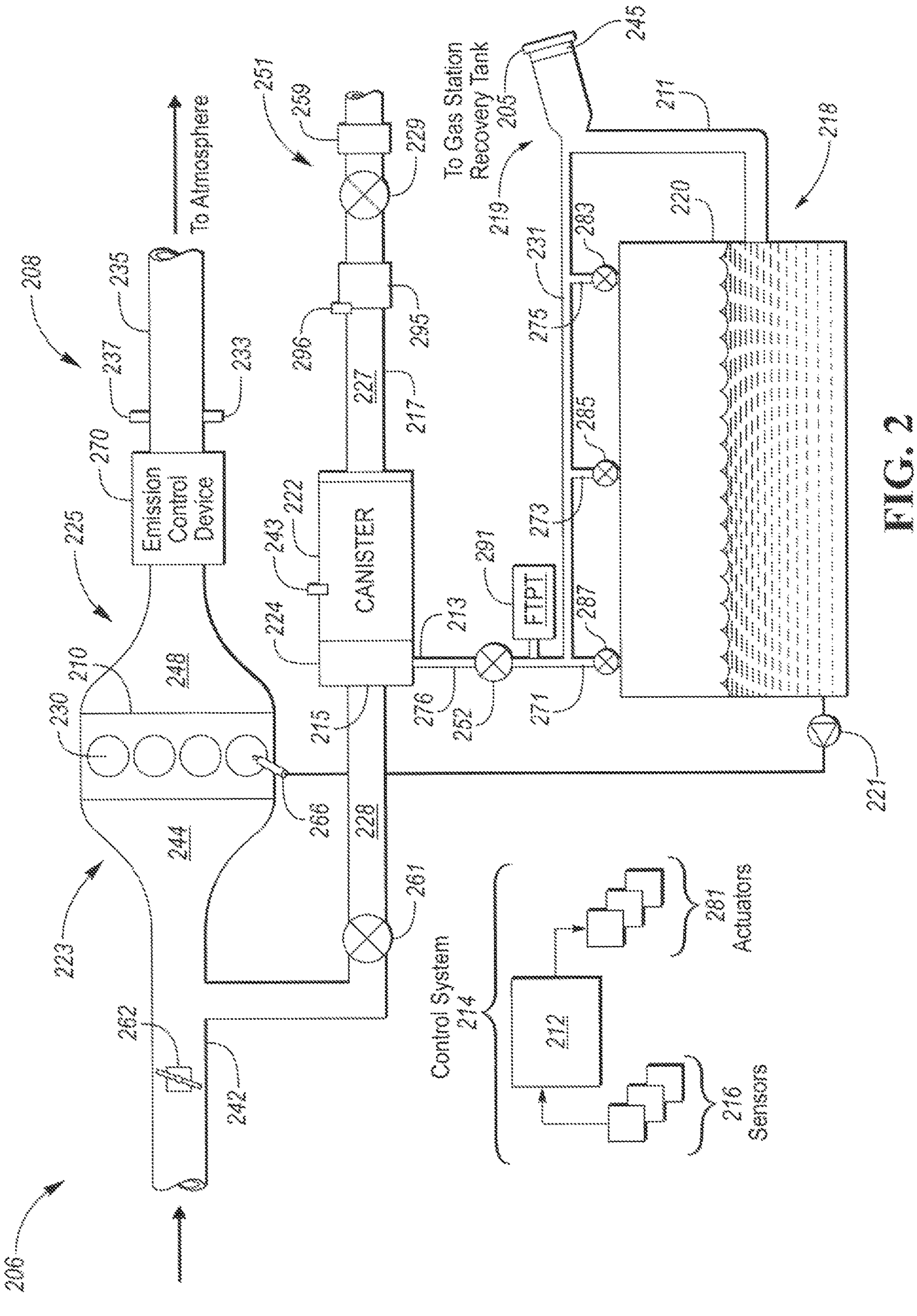
FIG. 2 shows an example engine system, fuel system, and evaporative emissions control (EVAP) system included in the example vehicle system of FIG. 1.
Figure 3:
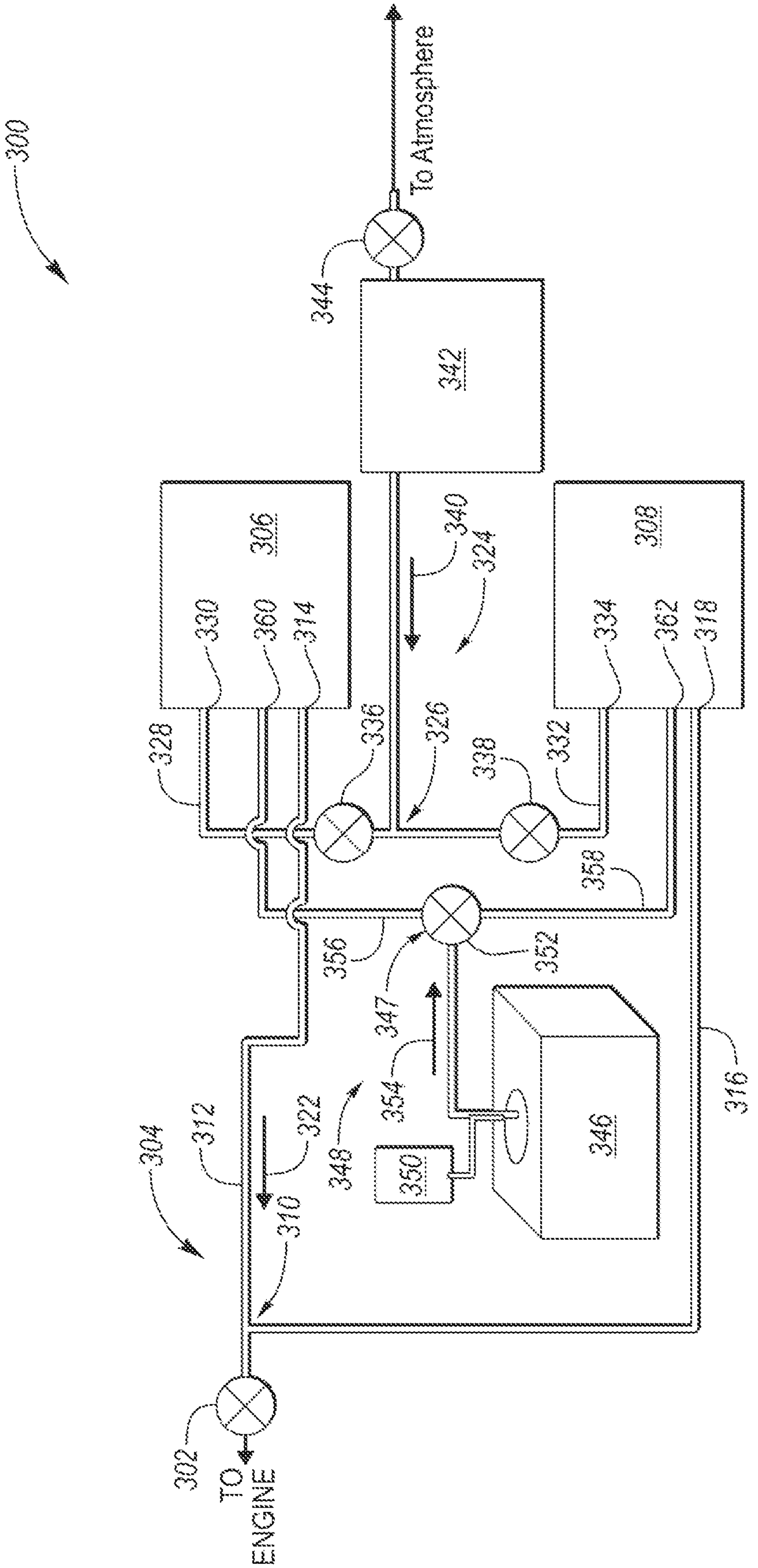
FIG. 3 shows a first example EVAP system, which may be an alternative example of the EVAP system of FIG. 2.

FIG. 2 shows a schematic depiction of a vehicle system 206. The vehicle system 206 includes an engine system 208 coupled to an evaporative emissions control system 251 and a fuel system 218. Emissions control system 251 includes a fuel vapor container such as fuel vapor canister 222 which may be used to capture and store fuel vapors. In some examples, vehicle system 206 may be a hybrid electric vehicle system, such as the vehicle propulsion system 100 of FIG. 1.

The engine system 208 may include engine 210 having a plurality of cylinders 230. The engine 210 is configured to generate power to propel the vehicle. In one example, engine 210 is an embodiment of engine 110 of FIG. 1. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 configured to store fuel and coupled to a fuel pump system 221. In one example, fuel tank 220 includes fuel tank 144 of FIG. 1. The fuel pump system 221 may include one or more pumps for pressurizing fuel delivered to the injectors of engine 210, such as an example injector 266 shown. While a single injector 266 is shown, additional injectors are provided for each cylinder. It will be appreciated that fuel system 218 may be a return-less fuel system, a return fuel system, or various other types of fuel system.

Vapors generated in fuel system 218 may be routed to the fuel vapor recovery system or evaporative emissions control system 251, which includes fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves may be positioned in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a refueling system 219. In some examples, refueling system 219 may include a fuel cap 205 for sealing off the fuel filler system from the atmosphere. Refueling system 219 is coupled to fuel tank 220 via a fuel filler pipe 211.

Further, refueling system 219 may include a refueling lock 245. In some embodiments, the refueling lock 245 may be a fuel cap locking mechanism. The fuel cap locking mechanism may be configured to automatically lock the fuel cap 205 in a closed position so that the fuel cap cannot be opened. For example, the fuel cap 205 may remain locked via refueling lock 245 while pressure or vacuum in the fuel tank 220 is greater than a threshold. In response to a refueling request, e.g., a vehicle operator initiated request via actuation of a refueling button on a vehicle dashboard (such as refueling button 197 on vehicle instrument panel 196 of FIG. 1), the fuel tank may be depressurized and the fuel cap unlocked after the pressure or vacuum in the fuel tank falls below a threshold. Herein, unlocking the refueling lock 245 may include unlocking the fuel cap 205. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

While illustrated as one controller, the controller 212 may be part of a larger control system and may be controlled by various other controllers throughout the vehicle 10, such as a vehicle system controller (VSC). It should therefore be understood that the controller 212 and one or more other controllers can collectively be referred to as a "controller" that controls various actuators in response to signals from various sensors to control functions the vehicle or vehicle subsystems. The controller 212 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 212 in controlling the vehicle or vehicle subsystems.

Control logic or functions performed by the controller 212 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 212. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The controller 212 may be configured to receive various states or conditions of the various vehicle components illustrated in FIG. 1 via electrical signals. The electrical signals may be delivered to the controller 212 from the various components via input channels. Additionally, the electrical signals received from the various components may be indicative of a request or a command to change or alter a state of one or more of the respective components of the vehicle.

The controller 212 includes output channels that are configured to deliver requests or commands (via electrical signals) to the various vehicle components. The controller 212 includes control logic and/or algorithms that are configured to generate the requests or commands delivered through the output channels based on the requests, commands, conditions, or states of the various vehicle components.

Emissions control system 251 may include one or more fuel vapor canisters 222 (herein also referred to simply as canister) filled with an appropriate adsorbent, the canisters configured to temporarily trap fuel vapors (including vaporized hydrocarbons) generated during fuel tank refilling operations and "running loss" vapors (that is, fuel vaporized during vehicle operation). In one example, the adsorbent used is activated charcoal. Emissions control system 251 may further include a canister ventilation path or vent line 227 which may route gases out of the fuel vapor canister 222 to the atmosphere when storing, or trapping, fuel vapors from fuel system 218. When the emissions control system 251 includes more than one canister 222, the canisters may be arranged in series or in parallel. When the canisters are arranged in series, gases may be routed to a first canister of the more than one canisters, then from the first canister to a second canister of the more than one canisters, and so on for additional canisters of the one or more canisters. When two canisters are arranged in parallel, a total volume of gases routed through the more than one canisters may be routed to the first canister or the second canister, or the total volume of gases may be divided into two volumes with a first volume of the two volumes routed through the first canister and a second volume of the two volumes routed through the second canister. Arranging the more than one canisters in parallel may be preferential to arranging the more than one canisters in series, because with canisters in parallel, restrictions (e.g., back pressure) from the first and the second canisters may be separated such that a first restriction of the first canister may not affect a flow rate of the second volume routed through the second canister, which may have a second, different restriction, and so on for additional canisters of the one or more canisters. Routing the flow of fuel vapors through parallel canisters and canister restriction is further described in FIGS. 3-9.

Vent line 227 may also allow fresh air to be drawn into canister 222 via vent valve 229 when purging stored fuel vapors from fuel system 218 to engine intake 223 via purge line 228 and purge valve 261. For example, purge valve 261 may be normally closed but may be opened during certain conditions (such as certain engine running conditions) so that vacuum from engine intake manifold 244 is applied on the fuel vapor canister for purging. In some examples, vent line 227 may include an optional air filter 259 disposed therein upstream of canister 222. Flow of air and vapors between canister 222 and the atmosphere may be controlled by canister vent valve 229.

Undesired evaporative emission detection routines may be intermittently performed by controller 212 on fuel system 218 to confirm that the fuel system is not degraded. As such, undesired evaporative emission detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, undesired evaporative emission detection routines may be performed while the engine is running by operating a vacuum pump and/or using engine intake manifold vacuum. Undesired evaporative emission tests may be performed by an evaporative leak check module (ELCM) 295 communicatively coupled to controller 212. ELCM 295 may be coupled in vent line 227, between canister 222 and the vent valve 229. ELCM 295 may include a vacuum pump configured to apply a negative pressure to the fuel system when in a first conformation, such as when administering a leak test. ELCM 295 may further include a reference orifice and a pressure sensor 296. Following the application of vacuum to the fuel system, a change in pressure at the reference orifice (e.g., an absolute change or a rate of change) may be monitored and compared to a threshold. Based on the comparison, undesired evaporative emissions from the fuel system may be identified. The ELCM vacuum pump may be a reversible vacuum pump, and thus configured to apply a positive pressure to the fuel system when a bridging circuit is reversed placing the pump in a second conformation.

Canister 222 is configured as a multi-port canister. In the depicted example, canister 222 has three ports, to be further described in FIG. 3. These include a first load port 213 coupled to conduit 276 through which fuel vapors from fuel tank 220 are received in canister 222. In other words, fuel vapors that are to be absorbed in the canister 222 may be received via load port 213. Canister 222 further includes a second purge port 215 coupled to purge line 228 through which fuel vapors stored in the canister 222 can be released to the engine intake for combustion. In other words, fuel vapors that are desorbed from the canister 222 are purged to the engine intake via purge port 215. Canister 222 further includes a third purge port 217 coupled to vent line 227 through which air flow is received in the canister 222. The ambient air may be received in the canister for flowing through the adsorbent and releasing fuel vapors to the engine intake. Alternatively, air containing fuel vapors received in the canister via load port 213 may be vented to the atmosphere after the fuel vapors are adsorbed in canister 222.

Canister 222 may include a first buffer 224 surrounding load port 213. Like canister 222, buffer 224 may also include adsorbent. The volume of buffer 224 may be smaller than (e.g., a fraction of) the volume of canister 222. The adsorbent in the buffer 224 may be same as, or different from, the adsorbent in the canister (e.g., both may include charcoal). Buffer 224 may be positioned within canister 222 such that during canister loading through load port 213, fuel tank vapors are first adsorbed within the buffer, and then when the buffer is saturated, further fuel tank vapors are adsorbed in the main body of the canister. In comparison, when purging canister 222 with air drawn through vent line 227, fuel vapors are first desorbed from the canister (e.g., to a threshold amount) before being desorbed from the buffer. In comparison, when purging canister 222 with air drawn through vent line 227, fuel vapors are first desorbed from the canister (e.g., to a threshold amount) before being desorbed from the buffer. In other words, loading and unloading of buffer 224 is not linear with the loading and unloading of the canister. As such, the effect of the canister buffer is to dampen any fuel vapor spikes flowing from the fuel tank to the canister, thereby reducing the possibility of any fuel vapor spikes going to the engine or being released through a tailpipe.

Fuel tank 220 is fluidically coupled to canister 222 via a first conduit 276, the first conduit diverging from a fuel tank isolation valve (FTIV) 252 which controls the flow of fuel tank vapors from fuel tank 220 and vapor recovery line 231 into canister 222. In the depicted example, FTIV 252 is configured as a multi-way solenoid valve, specifically, a three-way valve. By adjusting a position of FTIV 252, fuel vapor flow from the fuel tank 220 to the canister 222 can be varied. FTIV 252 may be actuated to a first, open position that couples fuel tank 220 to canister 222 via conduit 276. In an example where the emissions control system 251 includes more than one canister 222 arranged in parallel, adjusting the position of the FTIV 252 to a first position may direct fuel vapor flow from the fuel tank 220 to a first canister, adjusting to a second position may direct fuel vapor flow from the fuel tank 220 to a second canister, and adjusting to a third position may direct fuel vapor flow from the fuel tank 220 to both the first and the second canisters. The FTIV may also be actuated to a fourth, closed position.

For example, FTIV 252 may be actuated to a closed position that seals fuel tank 220 from canister 222 when the emissions control system 251 includes one canister 222, wherein no fuel vapors flow through conduit 276. In the example where the emissions control system 251 includes more than one canister 222 arranged in parallel, the closed position seals fuel tank 220 from both of the first and the second canisters, wherein no fuel vapors flow through either of a first or a second canister conduit, which may branch off from the first conduit 276, to couple the fuel tank 220 to the first and the second canisters, respectively. Controller 212 may command an FTIV position based on fuel system conditions including an operator request for refueling, fuel tank pressure, and canister load. In a second example, a 0.03" orifice is included in the place of FTIV 252 to restrict vapor flow to the canister.

In configurations where the vehicle system 206 is a hybrid electric vehicle (HEV), fuel tank 220 may be designed as a sealed fuel tank that can withstand pressure fluctuations typically encountered during normal vehicle operation and diurnal temperature cycles (e.g., steel fuel tank). In addition, the size of the canister 222 may be reduced to account for the reduced engine operation times in a hybrid vehicle. However, for the same reason, HEVs may also have limited opportunities for fuel vapor canister purging operations. Therefore, the use of a sealed fuel tank with a closed FTIV (also referred to as NIRCOS, or Non-Integrated Refueling Canister Only System), prevents diurnal and running loss vapors from loading the fuel vapor canister 222, and limits fuel vapor canister loading via refueling vapors only. FTIV 252 may be selectively opened responsive to a refueling request to depressurize the fuel tank 220 before fuel can be received into the fuel tank via fuel filler pipe 211. In particular, when the emissions control system 251 includes one canister 222, FTIV 252 may be actuated to the first open position to depressurize the fuel tank to the canister via first conduit 276 and canister load port 213.

In some embodiments (not shown), a pressure control valve (PCV) may be configured in a conduit coupling fuel tank 220 to canister 222 in parallel to conduit 276. When included, the PCV may be controlled by the powertrain control module (e.g. controller 212) using a pulse-width modulation cycle to relieve any excessive pressure generated in the fuel tank, such as while the engine is running. Additionally or optionally, the PCV may be pulse-width modulated to vent excessive pressure from the fuel tank when the vehicle is operating in electric vehicle mode, for example in the case of a hybrid electric vehicle.

When transitioned to a second (open) position for the emissions control system 251 with one canister 222, FTIV 252 allows for the venting of fuel vapors from fuel tank 220 to canister 222. The second open position may be a fully open position and the first open position may be a partially open position, e.g., half open.

For the emissions control system 251 with at least one canister 222, including more than one canister 222 arranged in parallel, fuel vapors may be stored in canister 222 while air stripped off fuel vapors exits into atmosphere via canister vent valve 229. Stored fuel vapors in the canister 222 may be purged to engine intake 223, when engine conditions permit, via the purge valve 261. Refueling lock 245 may be unlocked to open a fuel cap after fuel tank is sufficiently depressurized, such as below the second threshold pressure.

The vehicle system 206 may further include a control system 214 (such as control system 190 of FIG. 1). Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, exhaust temperature or pressure sensor 233, fuel tank pressure transducer (FTPT) or pressure sensor 291, canister load sensor 243, and ELCM pressure sensor 296. As such, pressure sensor 291 provides an estimate of fuel system pressure. In one example, the fuel system pressure is a fuel tank pressure, e.g. within fuel tank 220. Other sensors such as pressure, temperature, air/fuel ratio, and composition sensors may be coupled to various locations in the vehicle system 206. As another example, the actuators may include the fuel injector 266, the throttle 262, the FTIV 252, the refueling lock 245, the canister vent valve 229, and the purge valve 261. The control system 214 may include a controller 212. The controller may receive input data from the various sensors, process the input data, and trigger the actuators in response to the processed input data based on instruction or code programmed therein corresponding to one or more routines. The controller 212 receives signals from the various sensors of FIGS. 1-2 and employs the various actuators of FIGS. 1-2 to adjust engine operation based on the received signals and instructions stored on a memory of the controller.

For example, responsive to an operator refueling request, the controller may retrieve sensor input from fuel tank pressure sensor 291 and compare it to a threshold. If the pressure is higher than the threshold, the controller may send a signal commanding FTIV 252 to a position that expedites depressurization of the fuel tank. Therein, based on canister load, as estimated via sensor 243, and/or based on an estimated time to depressurize the fuel tank, the controller 212 may adjust the position of FTIV 252 to depressurize the fuel vapors to the load port 213 of canister 222. Once the fuel tank has been sufficiently depressurized, as inferred based on the fuel tank pressure sensor output, the controller may send a signal commanding the refueling lock 245 to open or disengage so that fuel can be received in fuel tank 220 via the fuel filler pipe 211.

If the EVAP system of FIG. 2, including the emissions control system 251 and the fuel system 218, were to be included in a heavy-duty vehicle with a large fuel tank, as described above, the canister may be too small to effectively capture fuel vapors from the fuel tank, e.g., the canister may have a volume smaller than a volume of the fuel tank. Though the EVAP system of FIG. 2 may recirculate fuel vapors through the fuel tank via the vapor recovery line 231 and the fuel filler pipe 211, a majority of the fuel vapors may be emitted to the atmosphere via the refueling system 219 when the canister is small. In this example, the EVAP system of FIG. 2 may be an element of an offboard refueling vapor recovery (non-ORVR) vehicle.

An EVAP system of a vehicle configured for onboard refueling vapor recovery (ORVR) may include similar elements as described in FIG. 2, such as the engine system 208, an EVAP system, and a fuel system. However, in the example of heavy duty vehicles with large (e.g., 80 gallon) fuel tanks, the EVAP system and the fuel system may be modified for ORVR to efficiently capture fuel vapors of the large fuel tank and purge captured vapors to be used by the engine as fuel. In various embodiments, a plurality (e.g., at least two) of symmetric (e.g., same volumetric capacity) fuel vapor canisters may be arranged in parallel along a loading and unloading flow direction so that a total volume of fuel vapors may be equally divided and captured by the plurality of canisters. However, the symmetric canisters may have inherent restrictions from adsorbent elements in each canister that may cause the symmetric canisters to have different levels of restriction. Less fuel vapor and/or air may flow through a more restricted canister (e.g., higher loaded) compared to a less restricted canister (e.g., less loaded). Thus, a method to adjust a flow of the fuel vapor and/or air among at least two canisters during canister purging, where the at least two canisters are arranged in parallel, may result in equal loading of the at least two canisters relative to respective canister restriction. In other words, if a first canister of the at least two canisters has a higher load than a second canister of the at least two canisters, the flow may be increased through the first canister and decreased through the second canister. Alternatively, if the second canister has a higher load than the first canister, the flow may be decreased through the first canister and increased through the second canister. In a configuration with two canisters, the flow may be adjusted using a balance valve used to couple one or both of the canisters to the fuel tank, as well as a first canister vent valve coupled to the first canister and a second canister vent valve coupled to the second canister, each of the first and the second canister vent valves may be independently actuated to selectively isolate the respective canister from the atmosphere and/or purging backflow. In a configuration with n number of canisters (e.g., n=3), the flow may be adjusted using a balancing valve used to couple at least one of then number of canisters to the fuel tank, as well as n number of canister vent valves, each of the n number of canisters configured with a canister vent valve, where each of the n number of canister vent valves may be independently actuated to selectively isolate the respective canister from the atmosphere and/or purging backflow.

FIG. 3 shows a first example fuel vapor recovery or EVAP system 300 including two parallel fuel vapor canisters, a balancing valve, canister vent valves, and an optional bleed canister element. EVAP system 300 may be a non-limiting alternative example of EVAP system 251 and fuel system 218 of FIG. 2. For example, EVAP system 300 may be configured with n number of fuel vapor canisters and corresponding elements, as further described below. EVAP system 300 may be coupled to an intake manifold, such as intake manifold 244 of FIG. 2, via a canister purge valve (CPV) 302, which may be equivalent to the purge valve 261 of FIG. 2. The CPV 302 may be positioned on a purge line 304, the purge line 304 selectively coupling each of a first fuel vapor canister 306 and a second fuel vapor canister 308 to the intake manifold via the CPV 302. Stated in other terms, the CPV (i) is disposed between each of the first and second fuel vapor canisters 306, 308 and the engine 210, (ii) is configured to isolate each of the first and second fuel vapor canisters 306, 308 from the engine 210 when in a closed position, and (iii) is configured to establish fluid communication between each of the first and second fuel vapor canisters 306, 308 and the engine 210 when in an open position.

In one example, the first and the second canisters 306, 308 may be symmetric and may each have a volumetric capacity of 2.8 L with a 29×100 mm bleed. The first and the second canisters 306, 308 may be referred to as the first and second primary canisters. In another example, a BAX 1500 may be implemented as each of the first and the second canisters with 15.3 g/dl (100 ml) butane capacity when measured per 100% butane at 250 ml/min at 25° C. The first and the second canisters 306, 308 are arranged in the EVAP system 300 in a parallel loading flow direction and unloading flow direction. For example, the purge line 304 is bifurcated at a first node 310 and the first and the second canisters 306, 308 are positioned on each end of the bifurcation. For example, a first purge branch 312 is coupled to the first canister 306 at a first purge port 314. A second purge branch 316 is coupled to the second canister 308 at a second purge port 318. The first and the second purge branches 312 and 316, respectively, are parallel along the loading and unloading flow direction. The first and the second canisters 306, 308 are further coupled to a vent line 324, the vent line 324 being bifurcated at a second node 326. A first vent branch 328 is coupled to the first canister 306 at a first vent port 330 and a second vent branch 332 is coupled to the second canister 308 at a second vent port 334. The first and the second vent branches 328, 332 each have a valve positioned thereon to control air flow to and selectively isolate the respective canister. For example, a first canister vent valve (CVV) 336 is positioned on the first vent branch 328 and a second vent valve (CVV)338 is positioned on the second vent branch 332.

A portion of the vent line 324 upstream of the bifurcation, with respect to flow as depicted by arrow 340, may vent the EVAP system 300 to atmosphere, in one example. In another example, the EVAP system 300 may be configured with a bleed canister element (e.g., 35×100 mm) 342 and a third canister vent valve (CVV) 344 where, when the third CVV 344 is open, the EVAP system 300 vents to atmosphere. The bleed canister 342 may be referred to as the secondary canister and may be disposed between the each of first and the second canisters 306, 308 and the ambient surrounding or air (e.g., the atmosphere). CVV 344 (i) may be referred to as the secondary canister vent valve, (ii) is disposed between the bleed canister 342 and ambient surroundings, (iii) is configured to isolate the bleed canister 342 from the ambient surroundings (e.g., the atmosphere) when in a closed position, and (iii) configured to establish fluid communication between the bleed canister 342 and the ambient surroundings when in an open position. When configured with the bleed canister element 342, a controller (such as controller 212 of FIG. 2), may actuate the third CVV 344 to a closed position during leak detection, for example, during SHED emission testing. When the EVAP system 300 does not include the bleed canister element 342, the first and the second CVVs 336 and 338, respectively, may be commanded closed during leak detection.

CVV 336 is disposed between the first canister 306 and the bleed canister element 342. CVV 336 is configured to isolate the first canister 306 from the bleed canister element 342 when in a closed position and is configured to establish fluid communication between the first canister 306 and the bleed canister element 342 when in an open position. CVV 338 is disposed between the second canister 308 and the bleed canister element 342. CVV 338 is configured to isolate the second canister 308 from the bleed canister element 342 when in a closed position and is configured to establish fluid communication between the second canister 308 and the bleed canister element 342 when in an open position.

The first and the second canisters 306, 308 are further selectively coupled to a fuel tank 346, which may be equivalent to the fuel tank 220 of FIG. 2, via a load line 348. Stated in other terms the first and the second canisters 306, 308 are each selectively in fluid communication with the fuel tank 346 and are configured to receive and store evaporated fuel from the fuel tank 346. The fuel tank 346 includes a fuel tank pressure sensor (FTPT) 350 to measure pressure of the fuel tank and the at least one canister of the first canister and the second canister coupled to the fuel tank. The load line 348 is bifurcated at a third node 347 and has a balance valve 352 arranged at the third node 347 relative to a direction of fuel vapor flow, as shown by arrow 354. A first load branch 356 of the load line 348 couples the first canister 306 to the fuel tank 346 at a first load port 360 and a second load branch 358 of the load line 348 couples the second canister 308 to the fuel tank 346 at a second load port 362. The first and the second canisters 306, 308 are selectively coupled to the fuel tank 346 using the balance valve 352.

The balance valve 352 may be a three-way VBV, in one example. The three-way VBV 352 may be referred to as a fuel tank vent valve and may be used similarly to the FTIV 252 of FIG. 2 to direct flow between parallel first and second canisters, as further described below. More specifically, VBV 352 is disposed between the fuel tank 346 and each of the first and second canisters 306, 308, (ii) is configured to establish fluid communication between the fuel tank 346 and the first canister 306 but not the second canister 308 when in a first position, (iii) is configured to establish fluid communication between the fuel tank 346 and the second canister 308 but not the first canister 306 when in a second position, and (iv) is configured to establish fluid communication between the fuel tank 346 and each (e.g., both) of the first and second canisters 306, 308 when in a third position.

The first and the second canisters 306, 308 may be arranged in parallel in the EVAP system 300, as described above, which may allow an equal amount of air to flow through each of the first and second vent branches 328, 332, and an equal amount of fuel vapor to flow through each of the first and the second purge branches 312, 316 and the first and the second load branches 356, 358. Branches and regions of the purge line 304, the vent line 324, and the load line 348 may be sized such that a total length of the purge line 304, the vent line 324, and the load line 348 are similar in diameter and length. However, as described above, fuel vapor canisters may become restricted such that symmetric canisters, for example, canisters with the same load capacity, as is the case for the first and the second canisters 306, 308, may have different resulting capacities. To subject each of the first and the second canisters 306, 308 to equal fuel vapor loads during canister purging, flow among the first and the second canisters 306, 308 is adjusted to increase flow through a higher loaded (e.g., more restricted) canister. Flow may be adjusted by actuation of valves in the EVAP system 300, including the first CVV 336, the second CVV 338, and the VBV 352. Each of the first and the second CVVs 336, 338 are actuatable by a vehicle control system, such as the control system 190 of FIG. 1 and the control system 214 of FIG. 2. Upon actuation, the first CVV 336 may be adjusted between a first position or a second position. Upon actuation, the second CVV 338 may be adjusted between a third position or a fourth position. In one example, the first and the third positions are an open position (e.g., on) and the second and the fourth positions are a closed position (e.g., off). When in the open position, each CVV may couple a respective canister to the vent line 324. When in the closed position, the CVV may isolate the respective canister from the vent line 324. The first and the second CVVs 336, 338 may be independently actuated such that the first CVV 336 may be adjusted to the first or the second position when the second CVV 338 is in the third or the fourth position. Similarly, the second CVV 338 may be adjusted to the third or fourth position when the first CVV 336 is in the first or the second position. When the first CVV 336 or the second CVV 338 is in the closed position (e.g., the second or fourth position, respectively), the respective canister may be isolated from the vent line 324.

The three-way VBV 352 may be used to adjust flow of fuel vapor through the load line 348 by coupling the first canister 306 to the fuel tank 346 when the VBV 352 is in a first position, coupling the second canister 308 to the fuel tank 346 when the VBV 352 is in a second position, and coupling both the first and the second canisters 306, 308 to the fuel tank 346 when the VBV 352 is in a third position. The third position in which both the first canister 306 and the second canister 308 are in communication with the fuel tank 346 may be the default position of the VBV 352. By isolating the first or the second canisters 306, 308 from the fuel tank 346 when the VBV 352 is in the second or the first position, respectively, the isolated canister is blocked from backflow of fuel vapor into the respective load port (e.g., the first load port 360 of the first canister 306 or the second load port 362 of the second canister 308).

When the VBV 352 is commanded on, for example, by the controller, the VBV 352 may control flow path via mechanical means, such as springs, in one example. Commanding the VBV 352 on may also be considered as unlocking the VBV, such that the mechanical mechanism of the VBV 352 is able to move and open to one of the first, second, and third positions. For a path with higher flow (e.g., a larger pressure drop between the fuel tank 346 and the respective canister of the first or the second canisters), the VBV, when configured as a spring-loaded valve, may open to a position of the first, the second, and the third position that results in a lower pressure drop. For example, when pressure of the first canister is higher than pressure of the second canister, the VBV is in the second position, coupling the second canister 308 to the fuel tank 346. When the VBV 352 is off, the VBV may be locked in the present position (e.g., the first, second, or third position as described above), such that the VBV may not adjust to a different position of the first, second, and third positions.

Blocking backflow of fuel vapor into the isolated canister of the first and the second canisters 306, 308 may reduce unequal loading of fuel vapors into the first and the second canister. Unequal loading of fuel vapors may result in a disproportionately higher level of fuel vapor being loaded into what would be the isolated canister, in an example where the VBV is omitted, which may result in one of the first and the second canisters being more restricted (e.g., having a higher load) than the other. Further examples of issues that may arise when the VBV 352 is omitted from the evaporative emissions control system are depicted in FIG. 4.

Figure 4A:
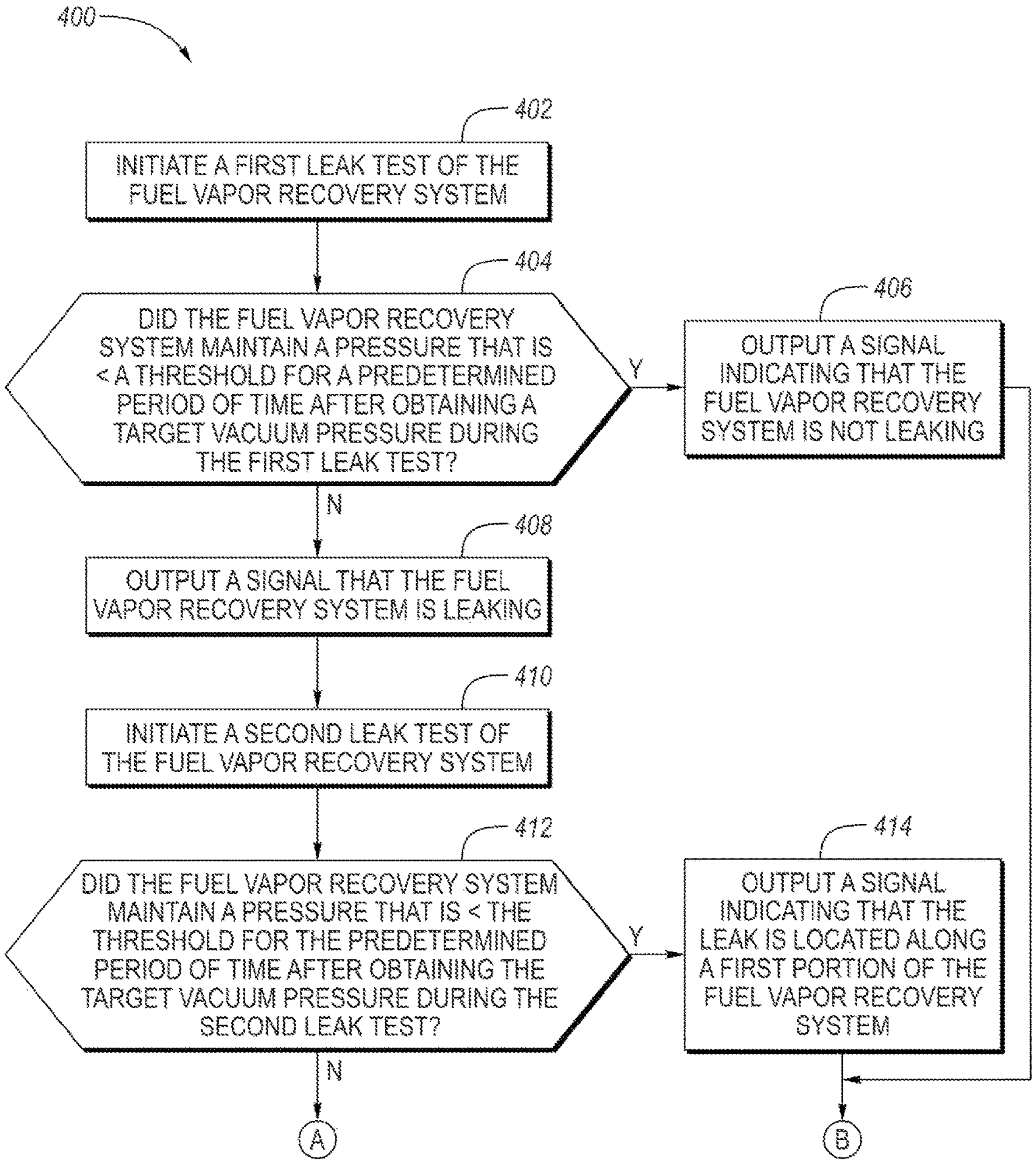
FIGS. 4A and 4B include a flow chart illustrating a method for troubleshooting the EVAP system.
Figure 4B:
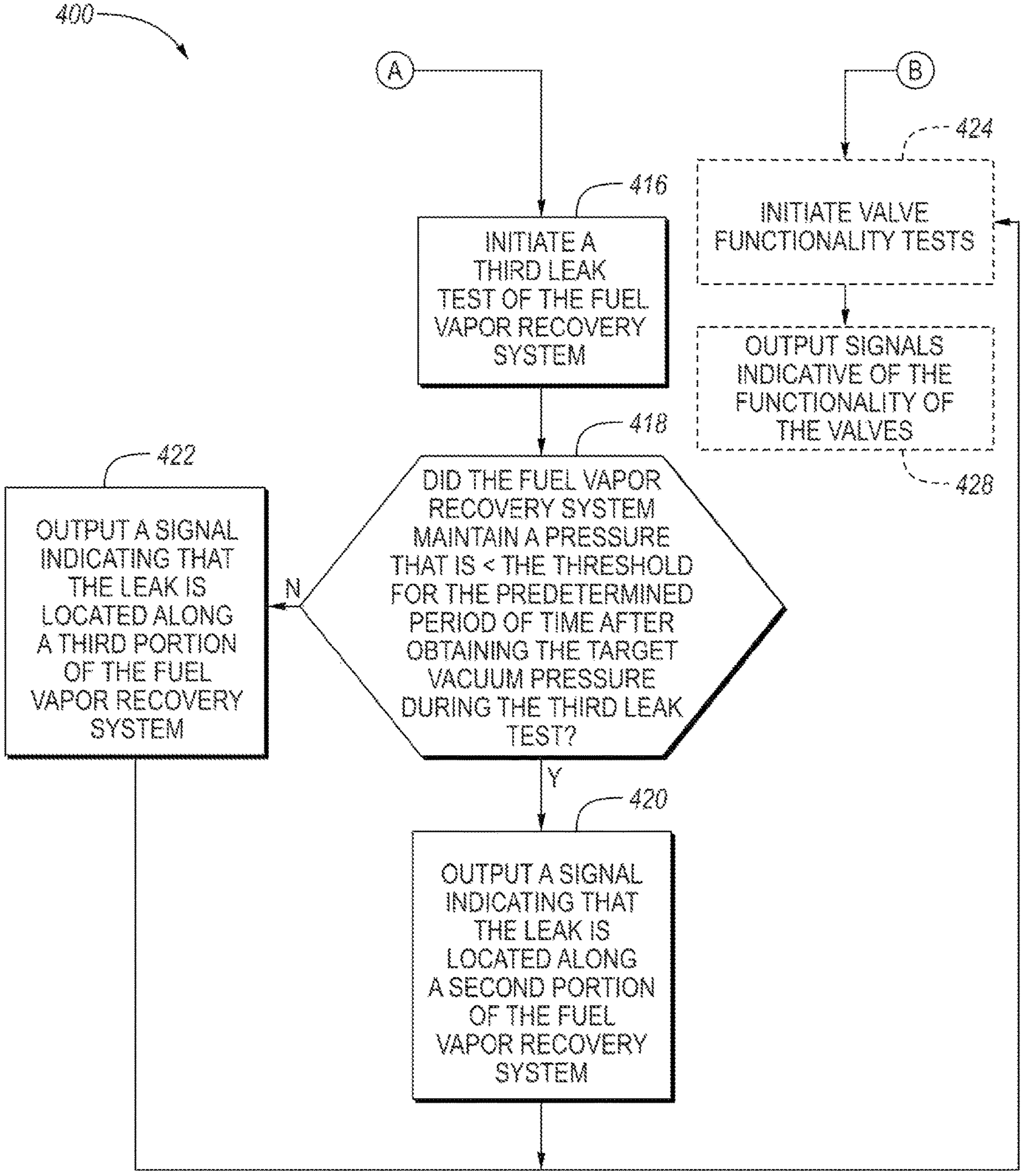

Referring to FIGS. 4A and 4B, a flowchart illustrating a method 400 for troubleshooting a fuel vapor recovery system (e.g., EVAP system 300) is illustrated. Also referring to FIG. 5, a graph illustrating the pressure of the EVAP system during a leak test is illustrated. The method 400 may be stored as control logic and/or an algorithm within a controller (e.g., control system 190, control system 214, controller 212). The method 400 begins at block 402, where a first leak test of the fuel vapor recovery system is initiated. The first leak test may be periodically or intermittently performed by the controller on the fuel vapor recovery system.

Figure 5:
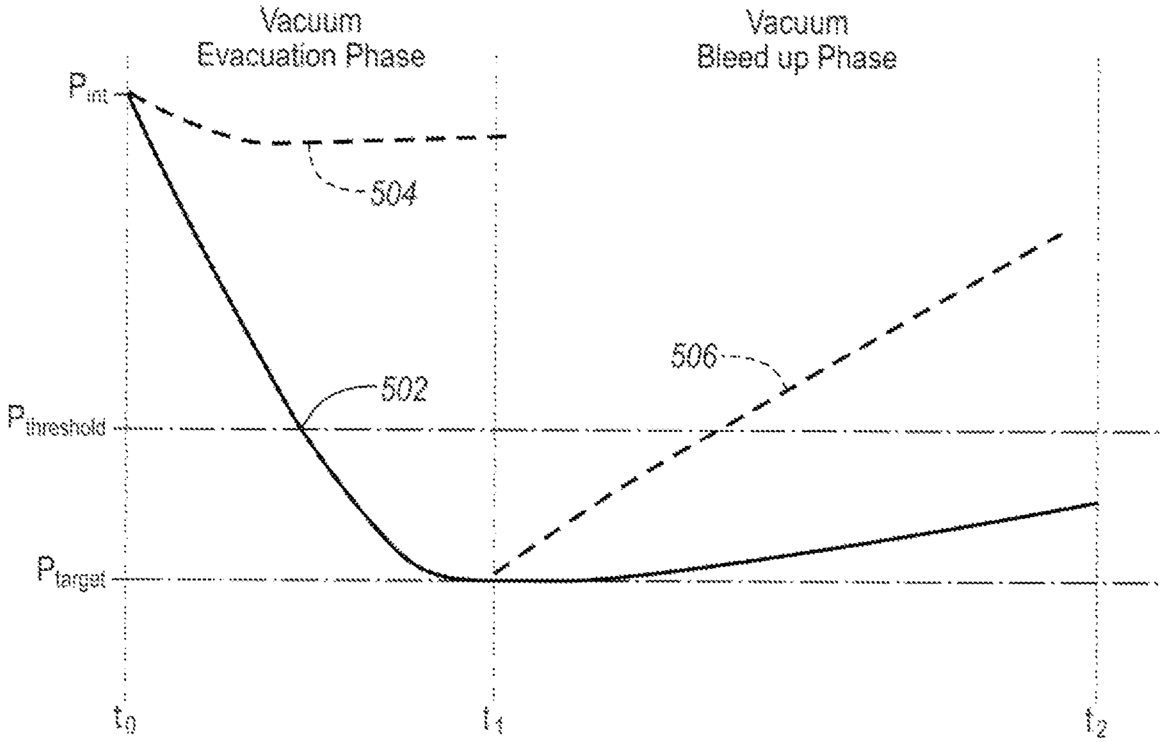
FIG. 5 is graph illustrating the pressure of the EVAP system during a leak test.

The first leak test, second leak test (mentioned below), third leak test (mentioned below), and any other leak test mentioned herein may be illustrated by the graph in FIG. 5. A leak test may include a vacuum evacuation phase, where the pressure of the fuel vapor recovery system is decreased from an initial value ($P_{int}$) to a target pressure ($P_{target}$). The pressure of the fuel vapor recovery system during a such a leak test and under normal conditions (e.g., conditions where there are no leaks within the fuel vapor recovery system) is illustrated by line 502. The vacuum evacuation phase of the fuel vapor recovery system is illustrated between times $t_0$ and $t_1$. The pressure of the fuel vapor recovery system ideally decreases to the target pressure ($P_{target}$) according to line 502. If the pressure of the fuel vapor recovery system is unable to obtain the target pressure ($P_{target}$) during the vacuum evacuation phase between times $t_0$ and $t_1$, which may be a predetermined time period, as illustrated by line 504, the fuel vapor recovery system may have leak.

After the vacuum evacuation phase and once the pressure of the fuel vapor recovery system decreases to the target pressure ($P_{target}$), the fuel vapor recovery system is sealed (e.g., all valves are closed to prevent venting to the atmosphere, engine, etc.) and transitions to a vacuum bleed up phase where the pressure of the fuel vapor recovery system is observed (e.g., the pressure of the fuel vapor recovery system is measured via the FTPT 350 and communicated to the controller). The vacuum bleed up phase may be a predetermined time period, which is illustrated as occurring between times $t_1$ and $t_2$ in FIG. 5. If the pressure of the fuel vapor recovery system increases to a value that is greater than a threshold ($P_{threshold}$) during the vacuum bleed up phase, as illustrated by line 506, the fuel vapor recovery system may have leak. The threshold ($P_{threshold}$) may be a set value as illustrated in FIG. 5 or may be a variable value that changes or increases during the predetermined time period between times $t_1$ and $t_2$ (i.e., during the vacuum bleed up phase).

Returning to block 402 of FIG. 4A, the first leak test may include (i) transitioning the fuel tank vent valve to the third position (e.g., transitioning the VBV 352 to or maintaining the VBV 352 in the third position such that the fuel tank 346 fluidly communicates with both the first and second canisters 306, 308); (ii) transitioning the first primary canister vent valve to the corresponding open position (e.g., transitioning the first CVV 336 to or maintaining the first CVV 336 in an open position establishing fluid communication between the first canister 306 and the bleed canister 342); (iii) transitioning the second primary canister vent valve to the corresponding open position (e.g., transitioning the second CVV 338 to or maintaining the second CVV 338 in an open position establishing fluid communication between the second canister 308 and the bleed canister 342); (iv) transitioning the secondary canister vent valve to the corresponding closed position (e.g., transitioning the third CVV 344 to or maintaining the third CVV 344 a closed position); (v) transitioning the canister purge valve to the open position to decrease a pressure of the fuel vapor recovery system to a target vacuum pressure (e.g., opening the CPV 302 so that the engine 210 may draw a vacuum on the fuel vapor recovery system, which corresponds to the vacuum evacuation phase illustrated between times $t_0$ and $t_1$ in FIG. 5); (vi) close the canister purge valve after obtaining the target vacuum pressure (e.g., closing the CPV 302 upon obtain the target vacuum pressure at time $t_1$ to transition from the vacuum evacuation phase to the vacuum bleed up phase); (vii) observing an increase in the pressure of the fuel vapor recovery system from the target vacuum pressure while the canister purge valve is closed (e.g., measuring the pressure of the fuel vapor recovery system during the vacuum bleed up phase via FTPT 350 and communicating the measured pressure to the controller).

Next, the method 400 moves on block 404 where it is determined if the fuel vapor recovery system maintained a pressure that is less than the threshold, $P_{threshold}$, (e.g., the pressure remained constant or increased but remained lower than the threshold, $P_{threshold}$) during the predetermined period of time after obtaining the threshold, $P_{threshold}$, during the first leak test (e.g., during the vacuum bleed up phase). If the pressure of the fuel vapor recovery system maintained a pressure that is less than the threshold, $P_{threshold}$, during the predetermined period of time at block 404, the method 400 moves on to block 406, where a signal is output the indicating that the fuel vapor recovery system is not leaking (e.g., the controller outputs a signal that the fuel vapor recovery system is operating properly and not leaking). If the pressure of the fuel vapor recovery system did not maintain a pressure that is less than the threshold, $P_{threshold}$, (e.g., the pressure increased to greater than the threshold, $P_{threshold}$) during the predetermined period of time at block 404, the method 400 moves on to block 408, where a signal is output the indicating that the fuel vapor recovery system is leaking (e.g., the controller outputs a signal that the fuel vapor recovery system is leaking). During the first leak test, the entirety of the fuel vapor recovery system may be leak tested.

The method 400 then moves onto block 410, where a second leak test of the fuel vapor recovery system is initiated. The second leak test may include (i) transitioning the fuel tank vent valve to the third position (e.g., transitioning the VBV 352 to or maintaining the VBV 352 in the third position such that the fuel tank 346 fluidly communicates with both the first and second canisters 306, 308); (ii) transitioning the first primary canister vent valve to the corresponding closed position (e.g., transitioning the first CVV 336 to or maintaining the first CVV 336 in a closed position to isolate the first canister 306 from the bleed canister 342 and the third CVV 344); (iii) transitioning the second primary canister vent valve to the corresponding closed position (e.g., transitioning the second CVV 338 to or maintaining the second CVV 338 in a closed position to isolate the second canister 308 from the bleed canister 342 and the third CVV 344); (iv) transitioning the canister purge valve to the open position to decrease a pressure of the fuel vapor recovery system to the target vacuum pressure (e.g., opening the CPV 302 so that the engine 210 may draw a vacuum on the fuel vapor recovery system, which corresponds to the vacuum evacuation phase illustrated between times $t_0$ and $t_1$ in FIG. 5); (v) close the canister purge valve after obtaining the target vacuum pressure (e.g., closing the CPV 302 upon obtain the target vacuum pressure at time $t_1$ to transition from the vacuum evacuation phase to the vacuum bleed up phase); and (vi) observing an increase in the pressure of the fuel vapor recovery system from the target vacuum pressure while the canister purge valve is closed during the second leak test (e.g., measuring the pressure of the fuel vapor recovery system during the vacuum bleed up phase via FTPT 350 and communicating the measured pressure to the controller).

Next, the method 400 moves on block 412 where it is determined if the fuel vapor recovery system maintained a pressure that is less than the threshold, $P_{threshold}$, (e.g., the pressure remained constant or increased but remained lower than the threshold, $P_{threshold}$) during the predetermined period of time after obtaining the threshold, $P_{threshold}$, during the second leak test (e.g., during the vacuum bleed up phase). If the pressure of the fuel vapor recovery system maintained a pressure that is less than the threshold, $P_{threshold}$, during the predetermined period of time at block 412, the method 400 moves on to block 414, where a signal is output (e.g., via the controller) indicating that the leak in the fuel vapor recovery system is located along a first portion of the fuel vapor recovery system. More specifically, the first portion of the fuel vapor recovery system may include (i) conduits extending between each of the first and second primary canister vent valves 336, 338 and the third CVV 344 (e.g., vent line 324), (ii) the bleed canister 342, or (iii) the third CVV 344. During the second leak test, the (i) conduits extending between each of the first and second primary canister vent valve 336, 338 and the third CVV 344 (e.g., vent line 324), (ii) the bleed canister 342, and (iii) the third CVV 344 are effectively isolated and excluded from the boundary of what is being leak tested.

If the pressure of the fuel vapor recovery system did not maintain a pressure that is less than the threshold, $P_{threshold}$, (e.g., the pressure increased to greater than the threshold, $P_{threshold}$) during the predetermined period of time at block 412, the method 400 moves on to block 416, where a third leak test of the fuel vapor recovery system is initiated. The third leak test may include (i) transitioning the fuel tank vent valve to the second position (e.g., transitioning the VBV 352 to or maintaining the VBV 352 in the second position such that the fuel tank 346 fluidly communicates with the second canister 308 and but is isolated from the first canister 306); (ii) transitioning the second primary canister vent valve to the corresponding closed position (e.g., transitioning the second CVV 338 to or maintaining the second CVV 338 in a closed position to isolate the second canister 308 from the bleed canister 342 and the third CVV 344); (iii) transitioning the canister purge valve to the open position to decrease a pressure of the fuel vapor recovery system to the target vacuum pressure (e.g., opening the CPV 302 so that the engine 210 may draw a vacuum on the fuel vapor recovery system, which corresponds to the vacuum evacuation phase illustrated between times $t_0$ and $t_1$ in FIG. 5); (iv) close canister purge valve after obtaining the target vacuum pressure (e.g., closing the CPV 302 upon obtain the target vacuum pressure at time $t_1$ to transition from the vacuum evacuation phase to the vacuum bleed up phase); (v) observing an increase in the pressure of the fuel vapor recovery system from the target vacuum pressure while the canister purge valve is closed during the third leak test (e.g., measuring the pressure of the fuel vapor recovery system during the vacuum bleed up phase via FTPT 350 and communicating the measured pressure to the controller).

Next, the method 400 moves on block 418 where it is determined if the fuel vapor recovery system maintained a pressure that is less than the threshold, $P_{threshold}$, (e.g., the pressure remained constant or increased but remained lower than the threshold, $P_{threshold}$) during the predetermined period of time after obtaining the threshold, $P_{threshold}$, during the third leak test (e.g., during the vacuum bleed up phase). If the pressure of the fuel vapor recovery system maintained a pressure that is less than the threshold, $P_{threshold}$, during the predetermined period of time at block 418, the method 400 moves on to block 420, where a signal is output (e.g., via the controller) indicating that the leak in the fuel vapor recovery system is located along a second portion of the fuel vapor recovery system. More specifically, the second portion of the fuel vapor recovery system may include the first canister 306 and conduits connected to the first canister 306 (e.g., first vent branch 328 or first load branch 356). If the pressure of the fuel vapor recovery system did not maintain a pressure that is less than the threshold, $P_{threshold}$, (e.g., the pressure increased to greater than the threshold, $P_{threshold}$) during the predetermined period of time at block 418, the method 400 moves on to block 422, where a signal is output (e.g., via the controller) indicating that the leak in the fuel vapor recovery system is located along a third portion of the fuel vapor recovery system. More specifically, the third portion of the fuel vapor recovery system may include the second canister 308 and conduits connected to the second canister 308 (e.g., second vent branch 332 or second load branch 358).

During the third leak test, the first canister 306 is effectively isolated and excluded from the boundary of what is being leak tested. The third leak test may be altered so that the second canister is isolated and excluded from the boundary of what is being leak tested. This may be accomplished by (i) transitioning the VBV 352 to the first position as opposed to the second position such that the fuel tank 346 fluidly communicates with the first canister 306 and but is isolated from the second canister 308 and (ii) transitioning the first CVV 336 as opposed to the second CVV 338 to a closed position to isolate the first canister 306 from the bleed canister 342 and the third CVV 344 during the third leak test. In such an alternative configuration, (i) the leak will be located along third portion of the fuel vapor recovery system if the pressure of the fuel vapor recovery system maintains pressure that is less than the threshold, $P_{threshold}$, during the predetermined period of time at block 418 or (ii) the leak will be located along second portion of the fuel vapor recovery system if the pressure of the fuel vapor recovery system did not maintain a pressure that is less than the threshold, $P_{threshold}$, (e.g., the pressure increased to greater than the threshold, $P_{threshold}$) during the predetermined period of time at block 418.

After block 406, block 414, block 420, block 422, or independently of blocks 402 through 422, the method 400 may move on to block 424 where functionality tests are initiated on one or more of the valves (e.g., first CVV 336, second CVV 338, VBV 352, etc.). Once the functionality tests are complete, the method 400 moves on to block 426, where a signal is output (e.g., via the controller) indicative of the functionality of the valve.

A first set of the functionality tests performed at block 424 and block 426 may include performing a first functionality test for the first CVV 336 which includes (i) transitioning the VBV 352 to the first position such that the fuel tank 346 communicates with the first canister 306 but not the second canister 308, (ii) transitioning the first CVV 336 to the closed position, (iii) transitioning the second CVV 338 to the closed position, (iv) transitioning the third CVV 344 to the open position, and (v) evacuating the fuel vapor recovery system to drive the fuel vapor recovery system toward the target vacuum pressure, $P_{target}$, via opening the CPV 302. If the pressure of the fuel vapor recovery system obtains the target vacuum pressure, $P_{target}$, during the first functionality test for the first CVV 336, the controller outputs a signal indicating that the first CVV 336 is not stuck open. If the pressure of the fuel vapor recovery system does not obtain the target vacuum pressure, $P_{target}$, during the first functionality test for the first CVV 336, a second functionality test for the first CVV 336 is performed, which includes (i) transitioning the VBV 352 to the first position such that the fuel tank 346 communicates with the first canister 306 but not the second canister 308, (ii) transitioning the first CVV 336 to the closed position, (iii) transitioning the second CVV 338 to the closed position, (iv) transitioning the third CVV 344 to the closed position, and (v) evacuating the fuel vapor recovery system to drive the fuel vapor recovery system toward the target vacuum pressure, $P_{target}$, via opening the CPV 302. If the pressure of the fuel vapor recovery system obtains the target vacuum pressure, $P_{target}$, during the second functionality test for the first CVV 336, the controller outputs a signal indicating that the first CVV 336 is stuck open.

A second set of the functionality tests performed at block 424 and block 426 may include performing a third functionality test for the first CVV 336 which includes (i) transitioning the VBV 352 to the first position such that the fuel tank 346 communicates with the first canister 306 but not the second canister 308, (ii) transitioning the first CVV 336 to the open position, (iii) transitioning the second CVV 338 to the closed position, (iv) transitioning the third CVV 344 to the open position, and (v) evacuating the fuel vapor recovery system to drive the fuel vapor recovery system toward the target vacuum pressure, $P_{target}$, via opening the CPV 302. If the pressure of the fuel vapor recovery system obtains the target vacuum pressure, $P_{target}$, in less than a threshold time during the third functionality test for the first CVV 336, the controller outputs a signal indicating that the first CVV 336 is stuck closed.

A third set of the functionality tests performed at block 424 and block 426 may include performing a first functionality test for the second CVV 338 which includes (i) transitioning the VBV 352 to the second position such that the fuel tank 346 communicates with the second canister 308 but not the first canister 306, (ii) transitioning the first CVV 336 to the closed position, (iii) transitioning the second CVV 338 to the closed position, (iv) transitioning the third CVV 344 to the open position, and (v) evacuating the fuel vapor recovery system to drive the fuel vapor recovery system toward the target vacuum pressure, $P_{target}$, via opening the CPV 302. If the pressure of the fuel vapor recovery system obtains the target vacuum pressure, $P_{target}$, during the first functionality test for the second CVV 338, output a signal indicating that the second CVV 338 is not stuck open. If the pressure of the fuel vapor recovery system does not obtain the target vacuum pressure, $P_{target}$, during the first functionality test for the second CVV 338, a second functionality test for the second CVV 338 is performed, which includes (i) transitioning the VBV 352 to the second position such that the fuel tank 346 communicates with the second canister 308 but not the first canister 306, (ii) transitioning the first CVV 336 to the closed position, (iii) transitioning the second CVV 338 to the closed position, (iv) transitioning the third CVV 344 to the closed position, and (v) evacuating the fuel vapor recovery system to drive the fuel vapor recovery system toward the target vacuum pressure, $P_{target}$, via opening the CPV 302. If the pressure of the fuel vapor recovery system obtains the target vacuum pressure, $P_{target}$, during the second functionality test for the second CVV 338, the controller outputs a signal indicating that second CVV 338 is stuck open.

A fourth set of the functionality tests performed at block 424 and block 426 may include performing a third functionality test for the second CVV 338 which includes (i) transitioning the VBV 352 to the second position such that the fuel tank 346 communicates with the second canister 308 but not the first canister 306, (ii) transitioning the first CVV 336 to the closed position, (iii) transitioning the second CVV 338 to the open position, (iv) transitioning the third CVV 344 to the open position, and (v) evacuating the fuel vapor recovery system to drive the fuel vapor recovery system toward the target vacuum pressure, $P_{target}$, via opening the CPV 302. If the pressure of the fuel vapor recovery system obtains the target vacuum pressure, $P_{target}$, in less than a threshold time during the third functionality test for the second CVV 338, the controller outputs a signal indicating that the second CVV 338 is stuck closed.

A fifth set of the functionality tests performed at block 424 and block 426 may include performing first, second, and third functionality tests for the VBV 352. The first functionality test for the VBV 352 includes (i) transitioning the VBV 352 to the first position such that the fuel tank 346 communicates with the first canister 306 but not the second canister 308, (ii) transitioning the first CVV 336 to the closed position, (iii) transitioning the second CVV 338 to the open position, (iv) transitioning the third CVV 344 to the open position, (v) evacuating the fuel vapor recovery system to drive the fuel vapor recovery system toward the target vacuum pressure, $P_{target}$, via opening the CPV 302, and (vi) recording a first time period that was required to obtain the target vacuum pressure during the first functionality test for the VBV 352. The second functionality test for the VBV 352 includes (i) transitioning the VBV 352 to the second position such that the fuel tank 346 communicates with the second canister 308 but not the first canister 306, (ii) transitioning the first CVV 336 to the open position, (iii) transitioning the second CVV 338 to the closed position, (iv) transitioning the third CVV 344 to the open position, (v) evacuating the fuel vapor recovery system to drive the fuel vapor recovery system toward the target vacuum pressure, $P_{target}$, via opening the CPV 302, and (vi) recording a second time period that was required to obtain the target vacuum pressure during the second functionality test for the VBV 352. The third functionality test for the VBV 352 includes (i) transitioning the VBV 352 to the third position such that the fuel tank 346 communicates with both the first and second canisters 306, 308, (ii) transitioning the first CVV 336 to the closed position, (iii) transitioning the second CVV 338 to the closed position, (iv) evacuating the fuel vapor recovery system to drive the fuel vapor recovery system toward the target vacuum pressure, $P_{target}$, via opening the CPV 302, and (v) recording a third time period that was required to obtain the target vacuum pressure during the third functionality test for the VBV 352.

If (i) the first and second time periods required to obtain the target vacuum pressures during the first and second functionality tests for the VBV 352, respectively, have substantially equal values (e.g., are within a tolerable range or equal to each other) and (ii) the third time period required to obtain the target vacuum pressure during the third functionality test for the VBV 352 is greater than the first and second time periods, the controller outputs a signal indicating the VBV 352 is operating properly. If the first, second, and third time periods required to obtain the target vacuum pressures during the first, second, and third functionality tests for the VBV 352, respectively, have substantially equal values (e.g., are within a tolerable range or equal to each other), the controller outputs a signal indicating the VBV 352 is stuck in the third position (i.e., in the position where the fuel tank 346 communicates with both the first and second canisters 306, 308).

A sixth set of the functionality tests performed at block 424 and block 426 may include performing fourth and fifth functionality tests for the VBV 352. The fourth functionality test for the VBV 352 includes (i) transitioning the VBV 352 to the first position such that the fuel tank 346 communicates with the first canister 306 but not the second canister 308, (ii) transitioning the third CVV 344 to the closed position, and (iii) evacuating the fuel vapor recovery system to drive the fuel vapor recovery system toward the target vacuum pressure, $P_{target}$, via opening the CPV 302. If the pressure of the fuel vapor recovery system obtains the target vacuum pressure, $P_{target}$, during the fourth functionality test for the VBV 352, the controller outputs a signal indicating that the VBV 352 is operating properly. If the pressure of the fuel vapor recovery system does not obtain the target vacuum pressure, $P_{target}$, during the fourth functionality test for the VBV 352, the fifth functionality test for the VBV 352 is initiated.

The fifth functionality test for the VBV 352 includes (i) transitioning the VBV 352 to the second position such that the fuel tank 346 communicates with the second canister 308 but not first canister 306, (ii) transitioning the third CVV 344 to the closed position, and (iii) evacuating the fuel vapor recovery system to drive the fuel vapor recovery system toward the target vacuum pressure, $P_{target}$, via opening the CPV 302. If the pressure of the fuel vapor recovery system obtains the target vacuum pressure during the fifth functionality test for the VBV 352, the controller outputs a signal indicating that the VBV 352 is stuck in the second position (i.e., in the position where the fuel tank 346 communicates with the second canister 308 but not first canister 306).

A seventh set of the functionality tests performed at block 424 and block 426 may include performing sixth and seventh functionality tests for the VBV 352. The sixth functionality test for the VBV 352 includes (i) transitioning the VBV 352 to the second position such that the fuel tank 346 communicates with the second canister 308 but not first canister 306, (ii) transitioning the third CVV 344 to the closed position, and (iii) evacuating the fuel vapor recovery system to drive the fuel vapor recovery system toward the target vacuum pressure, $P_{target}$, via opening the CPV 302. If the pressure of the fuel vapor recovery system obtains the target vacuum pressure, $P_{target}$, during the sixth functionality test for the VBV 352, the controller outputs a signal indicating that the VBV 352 is operating properly. If the pressure of the fuel vapor recovery system does not obtain the target vacuum pressure, $P_{target}$, during the sixth functionality test for the VBV 352, the seventh functionality test for the VBV 352 is initiated.

The seventh functionality test for the VBV 352 includes (i) transitioning the VBV 352 to the first position such that the fuel tank 346 communicates with the first canister 306 but not the second canister 308, (ii) transitioning the third CVV 344 to the closed position, and (iii) evacuating the fuel vapor recovery system to drive the fuel vapor recovery system toward the target vacuum pressure, $P_{target}$, via opening the CPV 302. If the pressure of the fuel vapor recovery system obtains the target vacuum pressure, $P_{target}$, during the seventh functionality test for the VBV 352, the controller outputs a signal indicating that the VBV 352 is stuck in the first position (i.e., in the position where the fuel tank 346 communicates with the first canister 306 but not the second canister 308).

All of the signals output by the controller according to the method 400 may be displayed on a control panel (e.g., may be shown on a display screen or may include illuminating lights on a control panel), may be output to a diagnostic device (e.g., may be shown on a display of a diagnostic device), may be printed onto a medium such as paper, etc. It should be understood that the flowchart in FIGS. 4A and 4B is for illustrative purposes only and that the method 400 should not be construed as limited to the flowchart in FIGS. 4A and 4B. For example, some of the steps of the method 400 may be rearranged while others may be omitted entirely.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A fuel vapor recovery system comprising:

first and second canisters each (i) in fluid communication with a fuel tank and (ii) configured to receive and store evaporated fuel from the fuel tank;

a third canister disposed between each of the first and second canisters and ambient surroundings;

a first valve (i) disposed between the fuel tank and each of the first and second canisters, (ii) configured to establish fluid communication between the fuel tank and the first canister but not the second canister when in a first position, (iii) configured to establish fluid communication between the fuel tank and the second canister but not the first canister when in a second position, and (iv) configured to establish fluid communication between the fuel tank and each of the first and second canisters when in a third position;

a second valve disposed between the first canister and the third canister;

a third valve disposed between the second canister and the third canister;

a fourth valve disposed between the third canister and the ambient surroundings, wherein each of the second, third, and fourth valves are configured to transition between open and closed positions; and a controller programmed to, initiate a fuel vapor recovery system leak test, the fuel vapor recovery system leak test including (i) transitioning the first valve to the third position, (ii) transitioning the second valve to the open position, (iii) transitioning the third valve to the open position, (iv) transitioning the fourth valve to the closed position, (v) evacuating the fuel vapor recovery system to obtain a target vacuum pressure, and (vi) observing an increase in the pressure of the fuel vapor recovery system from the target vacuum pressure, in response to the pressure of the fuel vapor recovery system increasing to less than a threshold value from the target vacuum pressure within a predetermined period after obtaining the target vacuum pressure during fuel vapor recovery system leak test, output a signal indicating that the fuel vapor recovery system is not leaking, and in response to the pressure of the fuel vapor recovery system increasing to greater than the threshold value from the target vacuum pressure within a predetermined period after obtaining the target vacuum pressure during fuel vapor recovery system leak test, output a signal indicating that the fuel vapor recovery system is leaking.

2. The fuel vapor recovery system of claim 1, wherein the controller is further programmed to, in response to the signal indicating that the fuel vapor recovery system is leaking, initiate a second fuel vapor recovery system leak test, the second fuel vapor recovery system leak test including (i) transitioning the first valve to the third position, (ii) transitioning the second valve to the closed position, (iii) transitioning the third valve to the closed position, (iv) evacuating the fuel vapor recovery system to obtain the target vacuum pressure, and (vi) observing a second increase in the pressure of the fuel vapor recovery system from the target vacuum pressure.

3. The fuel vapor recovery system of claim 2, wherein the controller is further programmed to, in response to the pressure of the fuel vapor recovery system increasing to less than a second threshold value from the target vacuum pressure within a second predetermined period during the second fuel vapor recovery system leak test, output a signal indicating that the leak is located along (i) conduits extending between each of the second and third valves and the fourth valve, (ii) the third canister, or (iii) the fourth valve.

4. The fuel vapor recovery system of claim 2, wherein the controller is further programmed to, in response to the pressure of the fuel vapor recovery system increasing to greater than a second threshold value from the target vacuum pressure within a second predetermined period during the second fuel vapor recovery system leak test, initiate a third fuel vapor recovery system leak test.

5. The fuel vapor recovery system of claim 4, wherein the third fuel vapor recovery system leak test includes (i) transitioning the first valve to the second position, (ii) transitioning the third valve to the closed position, (iii) evacuating the fuel vapor recovery system to obtain a target vacuum pressure, and (iv) observing an increase in the pressure of the fuel vapor recovery system from the target vacuum pressure.

6. The fuel vapor recovery system of claim 5, wherein the controller is further programmed to, in response to the pressure of the fuel vapor recovery system increasing to less than a third threshold value from the target vacuum pressure within a third predetermined period during the third fuel vapor recovery system leak test, output a signal indicating that the leak is located along (i) the first canister or (ii) conduits connected to the first canister.

7. The fuel vapor recovery system of claim 5, wherein the controller is further programmed to, in response to the pressure of the fuel vapor recovery system increasing to greater than a third threshold value from the target vacuum pressure within a third predetermined period during the third fuel vapor recovery system leak test, output a signal indicating that the leak is located along (i) the second canister or (ii) conduits connected to the second canister.

8. The fuel vapor recovery system of claim 1, wherein the controller is further programmed to, initiate a first functionality test for the second valve via (i) transitioning the first valve to the first position, (ii) transitioning the second valve to the closed position, (iii) transitioning the third valve to the closed position, (iv) transitioning the fourth valve to the open position, and (v) evacuating the fuel vapor recovery system to drive the fuel vapor recovery system toward the target vacuum pressure, in response to the pressure of the fuel vapor recovery system obtaining the target vacuum pressure during the first functionality test, output a signal indicating that the second valve is not stuck open, in response to the pressure of the fuel vapor recovery system not obtaining the target vacuum pressure during the first functionality test for the second valve, initiate a second functionality test for the second valve via (i) transitioning the first valve to the first position, (ii) transitioning the second valve to the closed position, (iii) transitioning the third valve to the closed position, (iv) transitioning the fourth valve to the closed position, and (v) evacuating the fuel vapor recovery system to drive the fuel vapor recovery system toward the target vacuum pressure, and in response to the pressure of the fuel vapor recovery system obtaining the target vacuum pressure during the second functionality test, output a signal indicating that the second valve is stuck open.

9. The fuel vapor recovery system of claim 1, wherein the controller is further programmed to, initiate a functionality test for the second valve via (i) transitioning the first valve to the first position, (ii) transitioning the second valve to the open position, (iii) transitioning the third valve to the closed position, (iv) transitioning the fourth valve to the open position, and (v) evacuating the fuel vapor recovery system to drive the fuel vapor recovery system toward the target vacuum pressure, and in response to the pressure of the fuel vapor recovery system obtaining the target vacuum pressure in less than a threshold time during the functionality test, output a signal indicating that the second valve is stuck closed.

10. The fuel vapor recovery system of claim 1, wherein the controller is further programmed to, initiate a first functionality test for the third valve via (i) transitioning the first valve to the second position, (ii) transitioning the second valve to the closed position, (iii) transitioning the third valve to the closed position, (iv) transitioning the fourth valve to the open position, and (v) evacuating the fuel vapor recovery system to drive the fuel vapor recovery system toward the target vacuum pressure, in response to the pressure of the fuel vapor recovery system obtaining the target vacuum pressure during the first functionality test, output a signal indicating that the third valve is not stuck open, in response to the pressure of the fuel vapor recovery system not obtaining the target vacuum pressure during the first functionality test for the third valve, initiate a second functionality test for the third valve via (i) transitioning the first valve to the second position, (ii) transitioning the second valve to the closed position, (iii) transitioning the third valve to the closed position, (iv) transitioning the fourth valve to the closed position, and (v) evacuating the fuel vapor recovery system to drive the fuel vapor recovery system toward the target vacuum pressure, and in response to the pressure of the fuel vapor recovery system obtaining the target vacuum pressure during the second functionality test, output a signal indicating that the third valve is stuck open.

11. The fuel vapor recovery system of claim 1, wherein the controller is further programmed to, initiate a functionality test for the third valve via (i) transitioning the first valve to the second position, (ii) transitioning the second valve to the closed position, (iii) transitioning the third valve to the open position, (iv) transitioning the fourth valve to the open position, and (v) evacuating the fuel vapor recovery system to drive the fuel vapor recovery system toward the target vacuum pressure, and in response to the pressure of the fuel vapor recovery system obtaining the target vacuum pressure in less than a threshold time during the functionality test, output a signal indicating that the third valve is stuck closed.

12. The fuel vapor recovery system of claim 1, wherein the controller is further programmed to, initiate a first functionality test for the first valve via (i) transitioning the first valve to the first position, (ii) transitioning the second valve to the closed position, (iii) transitioning the third valve to the open position, (iv) transitioning the fourth valve to the open position, (v) evacuating the fuel vapor recovery system to drive the fuel vapor recovery system toward the target vacuum pressure, and (vi) recording a first time period to obtain the target vacuum pressure during the first functionality test for the first valve, initiate a second functionality test for the first valve via (i) transitioning the first valve to the second position, (ii) transitioning the second valve to the open position, (iii) transitioning the third valve to the closed position, (iv) transitioning the fourth valve to the open position, (v) evacuating the fuel vapor recovery system to drive the fuel vapor recovery system toward the target vacuum pressure, and (vi) recording a second time period to obtain the target vacuum pressure during the second functionality test for the first valve, initiate a third functionality test for the first valve via (i) transitioning the first valve to the third position, (ii) transitioning the second valve to the closed position, (iii) transitioning the third valve to the closed position, (iv) evacuating the fuel vapor recovery system to drive the fuel vapor recovery system toward the target vacuum pressure, and (v) recording a third time period to obtain the target vacuum pressure during the third functionality test for the first valve, in response to (i) the first time period and second time period having substantially equal values and (ii) the third time period being greater than the first and second time periods, output a signal indicating the first valve is operating properly, and in response to the first time period, the second time period, and the third time period having substantially equal values, output a signal indicating that the first valve is stuck in the third position.

13. The fuel vapor recovery system of claim 1, wherein the controller is further programmed to, initiate a first functionality test for the first valve via (i) transitioning the first valve to the first position, (ii) transitioning the fourth valve to the closed position, and (iii) evacuating the fuel vapor recovery system to drive the fuel vapor recovery system toward the target vacuum pressure, in response to the pressure of the fuel vapor recovery system obtaining the target vacuum pressure during the first functionality test, output a signal indicating that the first valve is operating properly, in response to the pressure of the fuel vapor recovery system not obtaining the target vacuum pressure during the first functionality test, initiate a second functionality test for the first valve via (i) transitioning the first valve to the second position, (ii) transitioning the fourth valve to the closed position, and (iii) evacuating the fuel vapor recovery system to drive the fuel vapor recovery system toward the target vacuum pressure, and in response to the pressure of the fuel vapor recovery system obtaining the target vacuum pressure during the second functionality test, output a signal indicating that the first valve is stuck in the second position.

14. The fuel vapor recovery system of claim 1, wherein the controller is further programmed to, initiate a first functionality test for the first valve via (i) transitioning the first valve to the second position, (ii) transitioning the fourth valve to the closed position, and (iii) evacuating the fuel vapor recovery system to drive the fuel vapor recovery system toward the target vacuum pressure, in response to the pressure of the fuel vapor recovery system obtaining the target vacuum pressure during the first functionality test, output a signal indicating that the first valve is operating properly, in response to the pressure of the fuel vapor recovery system not obtaining the target vacuum pressure during the first functionality test, initiate a second functionality test for the first valve via (i) transitioning the first valve to the first position, (ii) transitioning the fourth valve to the closed position, and (iii) evacuating the fuel vapor recovery system to drive the fuel vapor recovery system toward the target vacuum pressure, and in response to the pressure of the fuel vapor recovery system obtaining the target vacuum pressure during the second functionality test, output a signal indicating that the first valve is stuck in the first position.

15. A method for controlling a fuel vapor recovery system having first, second, and third canisters and a plurality of control valves comprising:

isolating an entirely of the fuel vapor recovery system from ambient surroundings during a leak test via adjusting the plurality of valves;

evacuating the entirety of the fuel vapor recovery system to obtain a target vacuum pressure during the leak test;

in response to the pressure of the entirety of the fuel vapor recovery system increasing to less than a threshold value from the target vacuum pressure within a predetermined period after obtaining the target vacuum pressure during the leak test, outputting a signal indicating that the fuel vapor recovery system is not leaking;

in response to the pressure of the entirety of the fuel vapor recovery system increasing to greater than the threshold value from the target vacuum pressure within the predetermined period after obtaining the target vacuum pressure during the leak test, outputting a signal indicating that the fuel vapor recovery system is leaking;

in response to the signal indicating that the fuel vapor recovery system is leaking, isolating a portion of the fuel vapor recovery system from the ambient surroundings during a second leak test via adjusting the plurality of valves, the portion excluding the third canister and a first of the plurality of valves that is disposed between the third canister and the ambient surroundings;

evacuating the portion of the fuel vapor recovery system to obtain a target vacuum pressure during the second leak test; and in response to the pressure of the portion of the fuel vapor recovery system increasing to less than the threshold value from the target vacuum pressure within the predetermined period during the second leak test, outputting a signal indicating that the leak is located along (i) the third canister, (ii) the first of the plurality of valves, or (iii) conduits connected to the third canister or the first of the plurality of valves.

16. The method of claim 15 further comprising:

in response to the pressure of the portion of the fuel vapor recovery system increasing to greater than the threshold value from the target vacuum pressure within the predetermined period during the second leak test, isolating the first canister from a remainder of the fuel vapor recovery system during a third fuel vapor recovery system leak test via adjusting the plurality of valves;

evacuating the remainder of the fuel vapor recovery system to obtain a target vacuum pressure during the third leak test; and in response to the pressure of the remainder of the fuel vapor recovery system increasing to less than the threshold value from the target vacuum pressure within the predetermined period during the third leak test, outputting a signal indicating that the leak is located along (i) the first canister or (ii) conduits connected to the first canister; and in response to the pressure of the remainder of fuel vapor recovery system increasing to greater than the threshold value from the target vacuum pressure within the predetermined period during the third fuel vapor recovery system leak test, outputting a signal indicating that the leak is located along (i) the second canister or (ii) conduits connected to the second canister.

17. A vehicle comprising:

an engine configured to propel the vehicle;

a fuel tank configured to store fuel;

a fuel vapor recovery system having first and second primary canisters arranged in parallel, each (i) in fluid communication with the fuel tank and (ii) configured to receive and store evaporated fuel from the fuel tank, a secondary canister disposed between each of the first and second primary canisters and ambient surroundings, a fuel tank vent valve (i) disposed between the fuel tank and each of the first and second primary canisters, (ii) configured to establish fluid communication between the fuel tank and the first primary canister but not the second primary canister when in a first position, (iii) configured to establish fluid communication between the fuel tank and the second primary canister but not the first primary canister when in a second position, and (iv) configured to establish fluid communication between the fuel tank and each of the first and second primary canisters when in a third position, a first primary canister vent valve (i) disposed between the first primary canister and the secondary canister, (ii) configured to isolate the first primary canister from the secondary canister when in a closed position, and (iii) configured to establish fluid communication between the first primary canister and the secondary canister when in an open position, a second primary canister vent valve (i) disposed between the second primary canister and the secondary canister, (ii) configured to isolate the second primary canister from the secondary canister when in a closed position, and (iii) configured to establish fluid communication between the second primary canister and the secondary canister when in an open position, a secondary canister vent valve (i) disposed between the secondary canister and ambient surroundings, (ii) configured to isolate the secondary canister from the ambient surroundings when in a closed position, and (iii) configured to establish fluid communication between the secondary canister and the ambient surroundings when in an open position, and a canister purge valve (i) disposed between each of the first and second primary canisters and the engine, (ii) configured to isolate each of the first and second primary canisters from the engine when in a closed position, and (iii) configured to establish fluid communication between each of the first and second primary canisters and the engine when in an open position; and a controller programmed to, periodically initiate a fuel vapor recovery system leak test, the fuel vapor recovery system leak test including (i) transitioning the fuel tank vent valve to the third position, (ii) transitioning the first primary canister vent valve to the corresponding open position, (iii) transitioning the second primary canister vent valve to the corresponding open position, (iv) transitioning the secondary canister vent valve to the corresponding closed position, (v) transitioning the canister purge valve to the open position to decrease a pressure of the fuel vapor recovery system to a target vacuum pressure, (vi) close canister purge valve after obtaining the target vacuum pressure, (vii) observing an increase in the pressure of the fuel vapor recovery system from the target vacuum pressure while the canister purge valve is closed, in response to the pressure of the fuel vapor recovery system increasing to less than a threshold value from the target vacuum pressure within a predetermined period while the canister purge valve is closed during fuel vapor recovery system leak test, output a signal indicating that the fuel vapor recovery system is not leaking, and in response to the pressure of the fuel vapor recovery system increasing to greater than the threshold value from the target vacuum pressure within the predetermined period while the canister purge valve is closed during fuel vapor recovery system leak test, output a signal indicating that the fuel vapor recovery system is leaking.

18. The vehicle of claim 17, wherein the controller is further programmed to, in response to the signal indicating that the fuel vapor recovery system is leaking, initiate a second fuel vapor recovery system leak test, the second fuel vapor recovery system leak test including (i) transitioning the fuel tank vent valve to the third position, (ii) transitioning the first primary canister vent valve to the corresponding closed position, (iii) transitioning the second primary canister vent valve to the corresponding closed position, (iv) transitioning the canister purge valve to the open position to decrease a pressure of the fuel vapor recovery system to the target vacuum pressure, (v) close canister purge valve after obtaining the target vacuum pressure, and (vi) observing a second increase in the pressure of the fuel vapor recovery system from the target vacuum pressure while the canister purge valve is closed.

19. The vehicle of claim 18, wherein the controller is further programmed to, in response to the pressure of the fuel vapor recovery system increasing to less than the threshold value from the target vacuum pressure within the predetermined period while the canister purge valve is closed during the second fuel vapor recovery system leak test, output a signal indicating that the leak is located along (i) conduits extending between each of the first and second primary canister vent valve and the secondary canister vent valve, (ii) the secondary canister, or (iii) the secondary canister vent valve, in response to the pressure of the fuel vapor recovery system increasing to greater than the threshold value from the target vacuum pressure within the predetermined period while the canister purge valve is closed during the second fuel vapor recovery system leak test, initiate a third fuel vapor recovery system leak test, the third fuel vapor recovery system leak test includes (i) transitioning the fuel tank vent valve to the second position, (ii) transitioning the second primary canister vent valve to the corresponding closed position, (iii) transitioning the canister purge valve to the open position to decrease a pressure of the fuel vapor recovery system to the target vacuum pressure, (iv) close canister purge valve after obtaining the target vacuum pressure, (v) observing a third increase in the pressure of the fuel vapor recovery system from the target vacuum pressure while the canister purge valve is closed, in response to the pressure of the fuel vapor recovery system increasing to less than the threshold value from the target vacuum pressure within the predetermined period while the canister purge valve is closed during the third fuel vapor recovery system leak test, output a signal indicating that the leak is located along (i) the first primary canister or (ii) conduits connected to the first primary canister, and in response to the pressure of the fuel vapor recovery system increasing to greater than the threshold value from the target vacuum pressure within the predetermined period while the canister purge valve is closed during the third fuel vapor recovery system leak test, output a signal indicating that the leak is located along (i) the second primary canister or (ii) conduits connected to the second primary canister.

* * * * *